(12) United States Patent  
Murayama et al.

(10) Patent No.: US 9,395,814 B2
(45) Date of Patent: Jul. 19, 2016

(54) DISPLAY DEVICE

(75) Inventors: Atsuhiko Murayama, Kanagawa (JP); Hiroyuki Aoki, Kanagawa (JP); Seiji Sugahara, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/347,220

(22) PCT Filed: Aug. 8, 2012

(86) PCT No.: PCT/JP2012/070137
§ 371 (c)(1),
(2), (4) Date: Mar. 25, 2014

(87) PCT Pub. No.: WO2013/046942
PCT Pub. Date: Apr. 4, 2013

(65) Prior Publication Data
US 2014/0225828 A1    Aug. 14, 2014

(30) Foreign Application Priority Data

Sep. 26, 2011    (JP) .................................. 2011-208817

(51) Int. Cl.
*G06F 3/01*        (2006.01)
*G06F 3/0481*    (2013.01)
*G06F 3/0482*    (2013.01)

(52) U.S. Cl.
CPC .............. *G06F 3/013* (2013.01); *G06F 3/0481* (2013.01); *G06F 3/0482* (2013.01); *G06F 3/04812* (2013.01); *G06F 2203/04803* (2013.01)

(58) Field of Classification Search
CPC ..... G06F 3/1423; G06F 3/1446; G06F 3/147; G06F 3/0488; G06F 3/04883; G06F 3/044; G06F 3/04886; G06F 3/045; G09G 2300/026
See application file for complete search history.

(56) References Cited

U.S. PATENT DOCUMENTS

| | | | |
|---|---|---|---|
| 2009/0164930 A1* | 6/2009 | Chen et al. ..................... | 715/769 |
| 2009/0189829 A1 | 7/2009 | Hiramatsu et al. | |
| 2010/0182232 A1* | 7/2010 | Zamoyski ...................... | 345/157 |
| 2010/0248788 A1* | 9/2010 | Yook et al. .................... | 455/566 |
| 2010/0262928 A1* | 10/2010 | Abbott .......................... | 715/769 |
| 2011/0055763 A1* | 3/2011 | Utsuki et al. .................. | 715/835 |
| 2011/0298826 A1* | 12/2011 | Namba .......................... | 345/635 |

FOREIGN PATENT DOCUMENTS

| | | |
|---|---|---|
| JP | 10-260773 | 9/1998 |
| JP | 2000-138827 | 5/2000 |
| JP | 2003-058081 | 2/2003 |

(Continued)

OTHER PUBLICATIONS

International Search Report corresponding to International Application No. PCT/JP2012/070137, Sep. 11, 2012, 5 pages.

(Continued)

*Primary Examiner* — Md Saiful A Siddiqui
(74) *Attorney, Agent, or Firm* — Wilmer Cutler Pickering Hale and Dorr LLP

(57) ABSTRACT

A control unit (120) recognizes information that is being displayed in, from among display areas (110-1-110-3) that display information, a first display area and displays relevant information that relates to the information that was recognized in a second display area other than the first display area.

5 Claims, 15 Drawing Sheets

(56) References Cited

FOREIGN PATENT DOCUMENTS

| JP | 2004-259198 A | 9/2004 |
|----|---------------|--------|
| JP | 2005-038008   | 2/2005 |
| JP | 2005-045745   | 2/2005 |
| JP | 2007-141059   | 6/2007 |
| JP | 2009-157537   | 7/2009 |
| JP | 2009-180846   | 8/2009 |

OTHER PUBLICATIONS

Japanese Office Action issued in corresponding Japanese Application No. 2011-208817, dated Feb. 9, 2016, 2 pages.

* cited by examiner

Fig.2

| Information | Relevant information |
|---|---|
| A | A' |
|   | A" |
| B | B' |
|   | B" |
| C | C' |
| ⋮ | ⋮ |

Fig.3

| Information | Relevant information 1 | Relevant information 2 |
|---|---|---|
| A | A' | a' |
| B | B' | b' |
| C | C' | c' |
| ... | ... | ... |

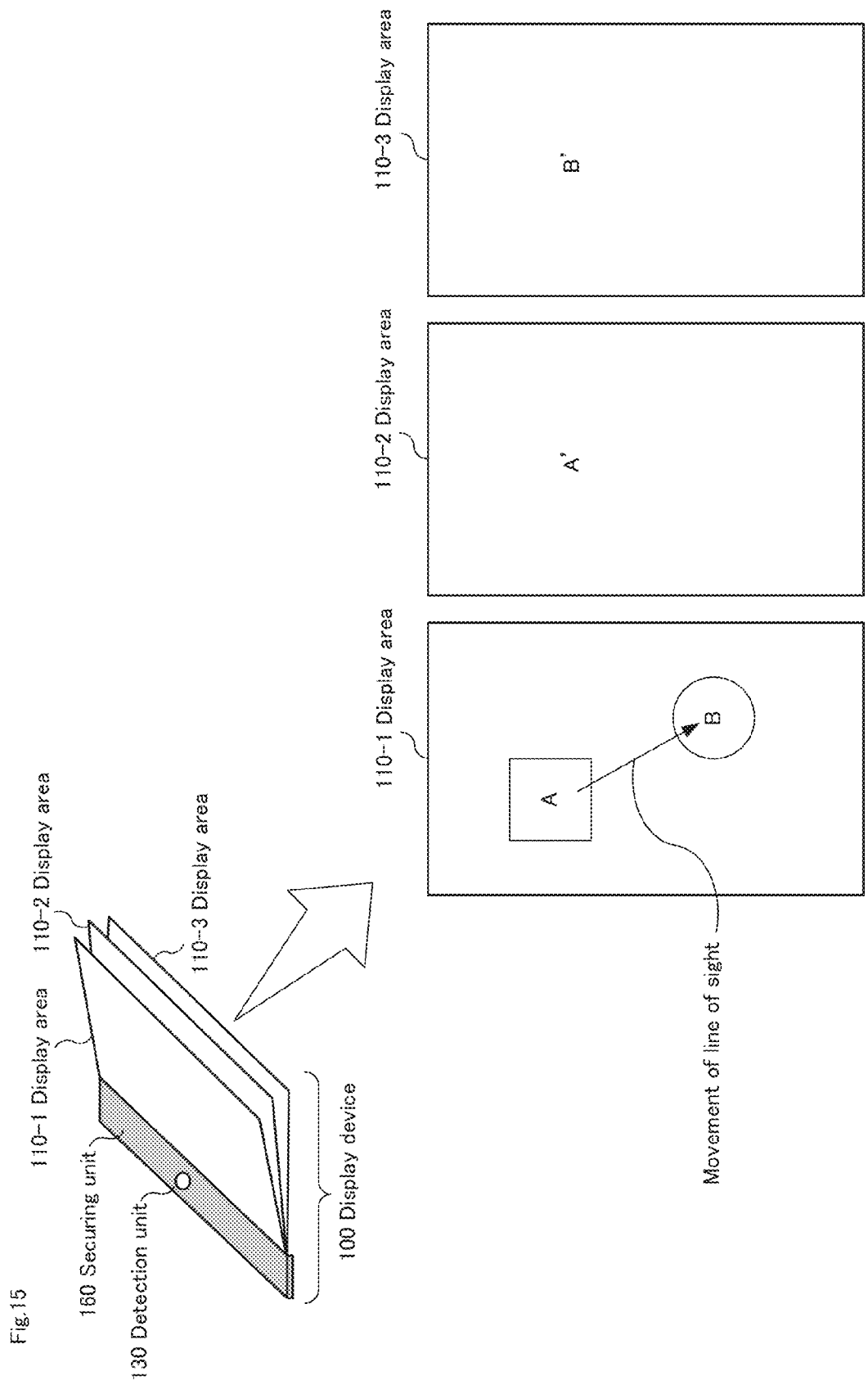

DISPLAY DEVICE

CROSS-REFERENCE TO RELATED APPLICATIONS

The present application is a national stage application of International Application No. PCT/JP2012/070137 entitled "Display Device" filed on Aug. 8, 2012, which claims benefit of priority from Japanese Patent Application No. JP2011-208817, filed on Sep. 26, 2011, the disclosures of which are incorporated herein in their entirety by reference thereto.

TECHNICAL FIELD

The present invention relates to a display device, a display method, and a program for displaying information.

BACKGROUND ART

In recent years, a wide variety of information is displayed on electronic apparatuses (hereinbelow referred to as display devices) in which displays are installed that display information. Among such display devices, devices have been considered that are made up of a plurality of thin display media and that are capable of being used as a book (for example, see Patent Document 1).

LITERATURE OF THE PRIOR ART

Patent Documents

Patent Document 1: Japanese Unexamined Patent Application Publication No. 2003-58081

SUMMARY OF THE INVENTION

Problem to be Solved by the Invention

In order to view information relating to the information that is displayed on a display in the above-described art, however, the display must be switched, connection must be made to a search site and the information entered as a search key and then searched and displayed, or information that is displayed on another display medium must be manually and visually searched. The time and effort necessary for carrying out these processes therefore becomes a problem.

It is an object of the present invention to provide a display device, a display method, and a program that solve the above-described problem.

Means for Solving the Problem

The display device of the present invention includes:
a plurality of display areas; and
a control unit that recognizes information that is displayed in, from among the plurality of display areas, a first display area and that displays relevant information that relates to the information that was recognized in a second display area other than the first display area.

The display method of the present invention is a display method for displaying information in a plurality of display areas and that includes processes of:
recognizing information that is displayed in, from among the plurality of display areas, a first display area; and
displaying relevant information that relates to the information that was recognized in a second display area other than the first display area.

The program of the present invention is a program for causing a display device that is provided with a plurality of display areas to execute procedures of:
recognizing information that is displayed in, from among the plurality of display areas, a first display area; and
displaying relevant information that relates to the information that was recognized in a second display area other than the first display area.

Effect of the Invention

In the present invention as described hereinabove, information that relates to information that is being displayed can be easily displayed.

BRIEF DESCRIPTION OF THE DRAWINGS

FIG. 2 shows an example of information that is stored in the memory unit shown in FIG. 1.

FIG. 3 shows another example of information that is stored in the memory unit shown in FIG. 1.

FIG. 15 shows another example of the display when information and relevant information are displayed on the display device that has the outer appearance shown in FIG. 7.

MODE FOR CARRYING OUT THE INVENTION

Exemplary embodiments of the present invention are next described with reference to the accompanying drawings.

Figure 1:
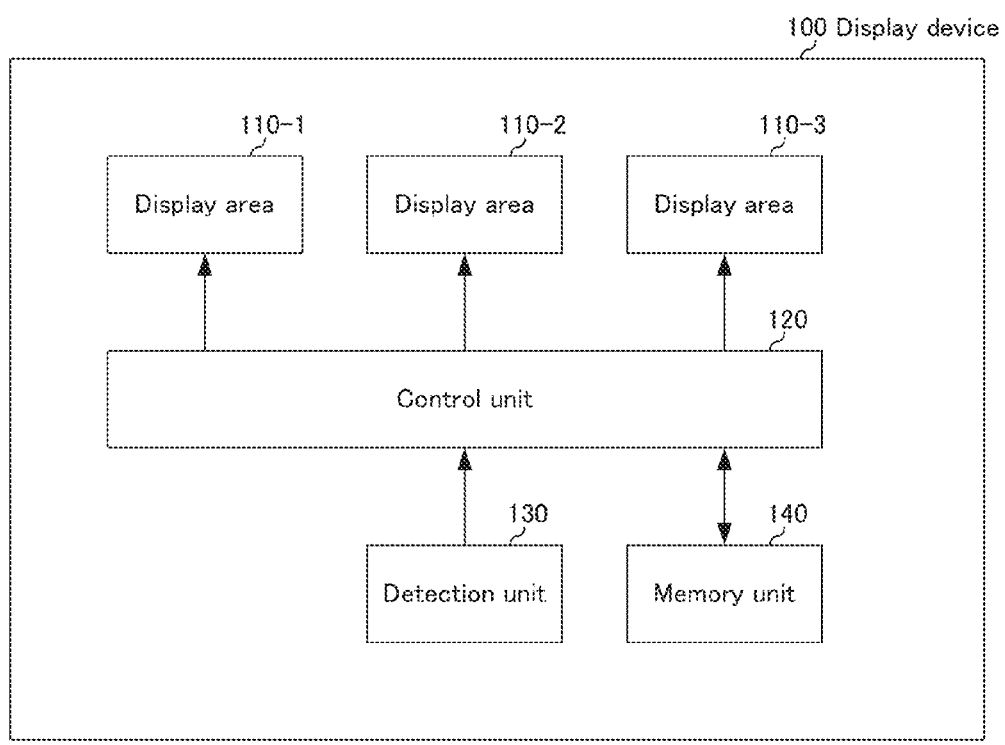
FIG. 1 shows the first exemplary embodiment of the display device of the present invention.

FIG. 1 shows the first exemplary embodiment of the display device of the present invention.

As shown in FIG. 1, display device 100 in the present exemplary embodiment is provided with: a plurality of display areas 110-1 to 110-3, control unit 120, detection unit 130, and memory unit 140. Of the constituent elements provided in display device 100, only those elements relating to the present invention are shown in FIG. 1. In addition, FIG. 1 shows an example having three display areas, but the number of display areas may be two or four or more.

Display areas 110-1 to 110-3 display information such as images or characters. In addition, display areas 110-1 to 110-3 may be areas arranged physically on one display. Alternatively, display areas 110-1- to -3 may be physically separated from each other. Alternatively, display areas 110-1 to 110-3 may be display media such as electronic paper that are stacked one on another.

Detection unit 130 detects the direction and movement of the line of sight of an operator that operates display device 100. Alternatively, detection unit 130 detects a predetermined blinking movement (blinking that continues within a predetermined time interval or a state in which the eyes are closed for at least a predetermined time interval) of the operator that manipulates display device 100. The method of detecting this direction or movement of the line of sight or blinking may be a method of using a dedicated function that is provided in a typical camera and is not particularly stipulated here.

Control unit 120 causes display of information on display areas 110-1-110-3. Control unit 120 further recognizes information that is displayed on any display area (hereinbelow referred to as the "first display area") among display areas 110-1-110-3. This method of recognizing recognizes which information is displayed at the position of the direction of the line of sight based on the results of detection of detection unit 130. For example, coordinates that indicate the position of the direction of the line of sight are compared with coordinates that indicate the display position of each item of information in an image that is currently being displayed to recognize the item of information for which the coordinates match. In addition, control unit 120 causes display of relevant information that relates to the information that was recognized in a display area (referred to as the "second display area") other than the first display area.

Control unit 120 recognizes, of the information that is displayed in the first display area, the information that is displayed in the direction of the line of sight when detection unit 130 detects that movement of the line of sight has stopped. Control unit 120 further brings about display in the second display area of relevant information that relates to the information that was recognized.

In addition, control unit 120 recognizes, of the information that is being displayed in the first display area, the information that is displayed in the direction of the line of sight when detection unit 130 has detected blinking by the operator. Control unit 120 further brings about display in the second display area of relevant information that relates to the information that was recognized. At this time, the direction of the line of sight that is detected may be the direction of the line of sight immediately before blinking was detected, or may be the direction of the line of sight immediately after blinking was detected.

Control unit 120 also reads the relevant information that relates to the information that was recognized from memory unit 140 and brings about display of the information in the second display area.

Memory unit 140 stores information that is being displayed in the first display area and relevant information that relates to the information that is being displayed in the first display area in mutual correspondence.

FIG. 2 shows an example of information that is stored in memory unit 140 shown in FIG. 1.

As shown in FIG. 2, information and relevant information that relates to the information are stored in mutual correspondence in memory unit 140 shown in FIG. 1. These items of information are acquired in advance from the outside and stored in memory unit 140.

For example, as shown in FIG. 2, information "A" and relevant information "A'" and "A''" are stored in mutual correspondence. This means that when the information that is recognized by control unit 120 is "A," the information that control unit 120 causes to be displayed in the second display area is "A'" and "A''." In addition, information "B" and relevant information "B'" and "B''" are stored in mutual correspondence. This means that when the information that is recognized by control unit 120 is "B," the information that control unit 120 causes to be displayed in the second display area is "B'" and "B''." Still further, information "C" and relevant information "C'" are stored in mutual correspondence. This means that when the information that is recognized by control unit 120 is "C," the information that control unit 120 causes to be displayed in the second display area is "C'."

FIG. 3 shows another example of the information that is stored in the memory unit shown in FIG. 1.

As shown in FIG. 3, information and relevant information that relates to this information are stored in mutual correspondence in memory unit 140 shown in FIG. 1. In this case, "relevant information 1" is relevant information that relates to this information, and "relevant information 2" is relevant information that relates to "relevant information 1." Thus, relevant information that relates to the information is stored hierarchically. These items of information are acquired in advance from the outside and stored in memory unit 140.

For example, information "A," relevant information 1 "A'," and relevant information 2 "a'" are stored in mutual association as shown in FIG. 3. This means that when the information that is recognized by control unit 120 is "A," the information that control unit 120 causes to be displayed in the second display area is "A'" and "a'." In addition, information "B" is stored in correspondence with relevant information 1 "B'" and relevant information 2 "b'." This means that when the information that is recognized by control unit 120 is "B," the information that control unit 120 causes to be displayed in the second display area is "B'" and "b'." Still further, information "C" is stored in association with relevant information "C'" and "c'." This means that when the information that is recognized by control unit 120 is "C," the information that control unit 120 causes to be displayed in the second display area is "C'" and "c'."

Figure 4:
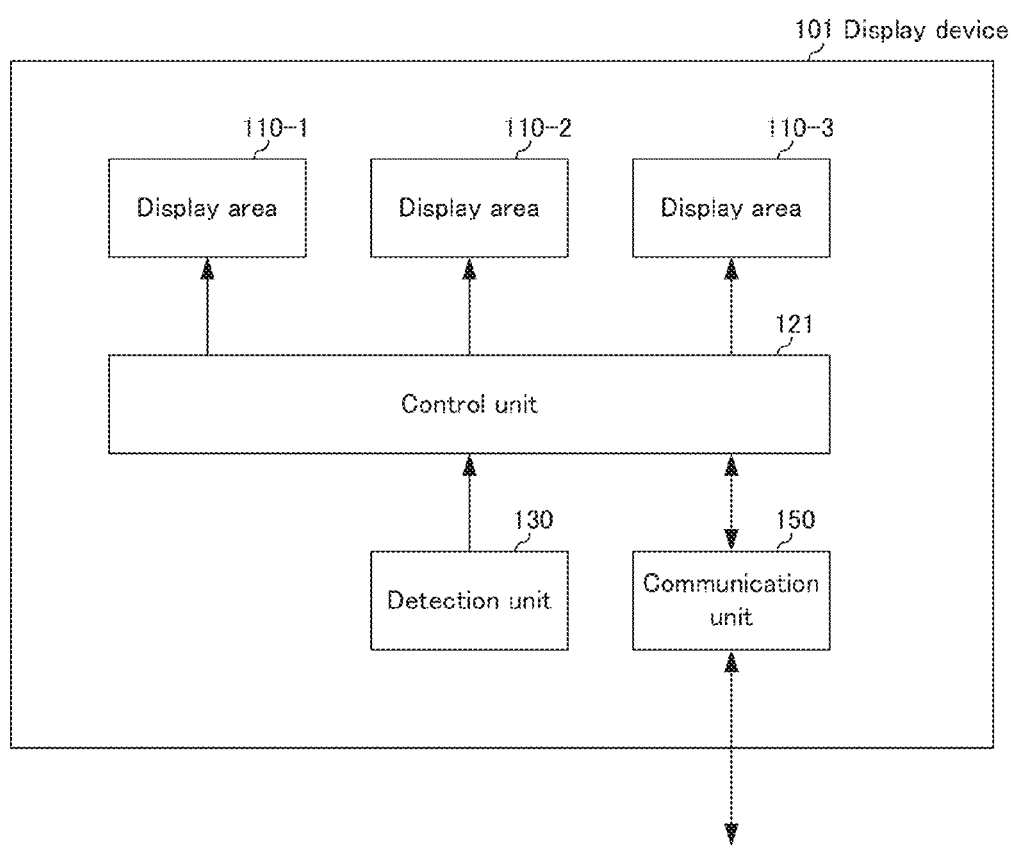
FIG. 4 shows the second exemplary embodiment of the display device of the present invention.

FIG. 4 shows the second exemplary embodiment of the display device of the present invention.

As shown in FIG. 4, display device 101 in the present exemplary embodiment is provided with a plurality of display areas 110-1 to 110-3, control unit 121, detection unit 130, and communication unit 150. Of the constituent elements provided to display device 101, only those elements that relate to the present invention are shown in FIG. 4. Although an example having three display areas is shown in FIG. 4, the number of display areas may be two, or four or more.

Display areas 110-1-110-3 are identical to the display areas shown in FIG. 1.

Detection unit 130 is identical to the detection unit shown in FIG. 1.

Control unit 121 does not read relevant information that is related to information that has been recognized from memory unit 140 as in the first exemplary embodiment, but rather, acquires the relevant information from a predetermined server that is connected to display device 101 by way of communication unit 150 and then displays the relevant information in the second display area. In order to acquire this information, a search of relevant information may be performed in a search site using the information that was recognized as the search key, and the relevant information may be acquired from a server that stores relevant information that has been searched. Other functions provided to control unit 121 are identical to the functions of control unit 120 shown in FIG. 1.

Communication unit 150 performs communication with a predetermined server that is connected to display device 101. This predetermined server is a communication device that is arranged at a site that is connected to a typical communication network and stores a variety of information. The server with which communication unit 150 communicates is not limited to one and may be a plurality of servers according to the information.

The outer appearance of the display device of the present invention is next described. In the following explanation, display device 100 shown in FIG. 1 is offered as an example.

Figure 5:
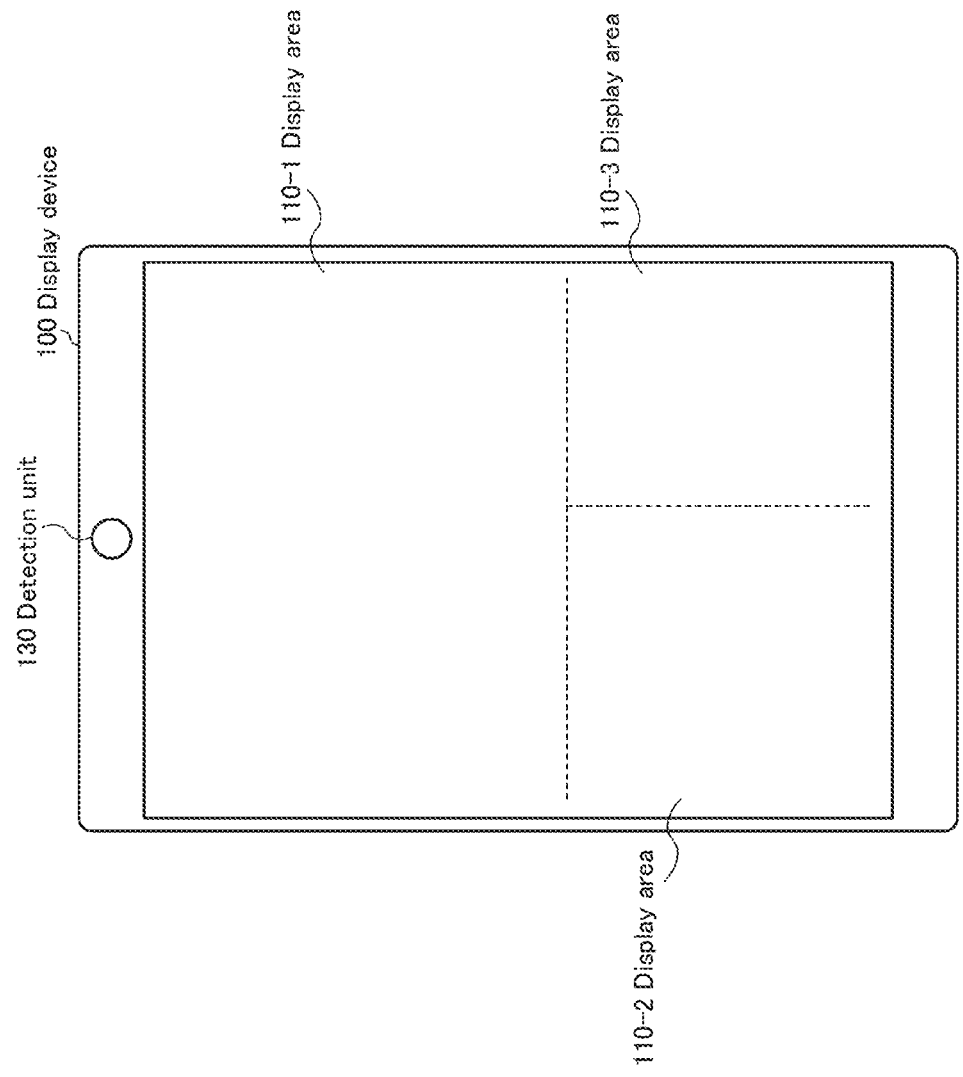
FIG. 5 shows a first example of the outer appearance of the display device shown in FIG. 1.

FIG. 5 shows a first example of the outer appearance of display device 100 shown in FIG. 1.

As shown in FIG. 5, three display areas 110-1 to 110-3 are arranged on one display in display device 100 shown in FIG. 1. The borders (shown by the dotted lines in FIG. 5) of display area 110-1, display area 110-2, and display area 110-3 should be recognizable by the operator that manipulates display device 100 but no particular stipulations apply. For example, when the text of e-mail is being entered on a portable terminal, the display areas may be a space showing the text input and spaces that show conversion candidates that are shown on the display. In addition, detection unit 130 is arranged at a position that allows the detection of the line of sight of the operator who is manipulating display device 100.

Figure 6:
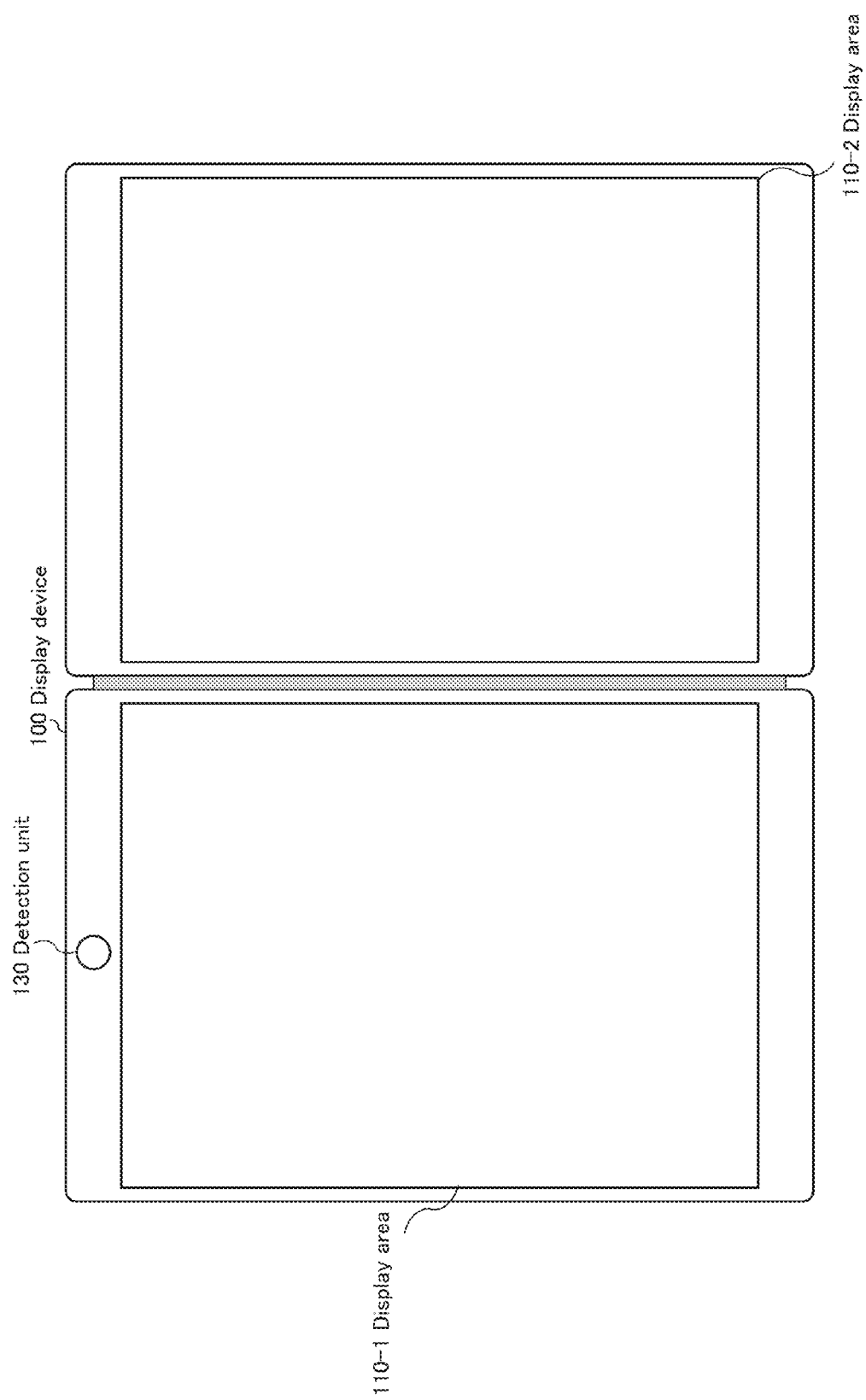
FIG. 6 shows a second example of the outer appearance of the display device shown in FIG. 1.

FIG. 6 shows a second example of the outer appearance of display device 100 shown in FIG. 1. FIG. 6 shows an example that lacks display area 110-3 shown in FIG. 1.

As shown in FIG. 6, display device 100 shown in FIG. 1 has a display (display unit) made up of a display area that is partitioned into display area 110-1 and display area 110-2. Here, display area 110-1 and display area 110-2 may be arranged on the same case, as shown in FIG. 5. Alternatively, display area 110-1 and display area 110-2 may each be arranged on respectively different cases (a plurality of display media) that are connected by, for example, a hinge, as shown in FIG. 6. In addition, detection unit 130 is arranged at a position that allows detection of the line of sight of the operator that manipulates display device 100.

Figure 7:
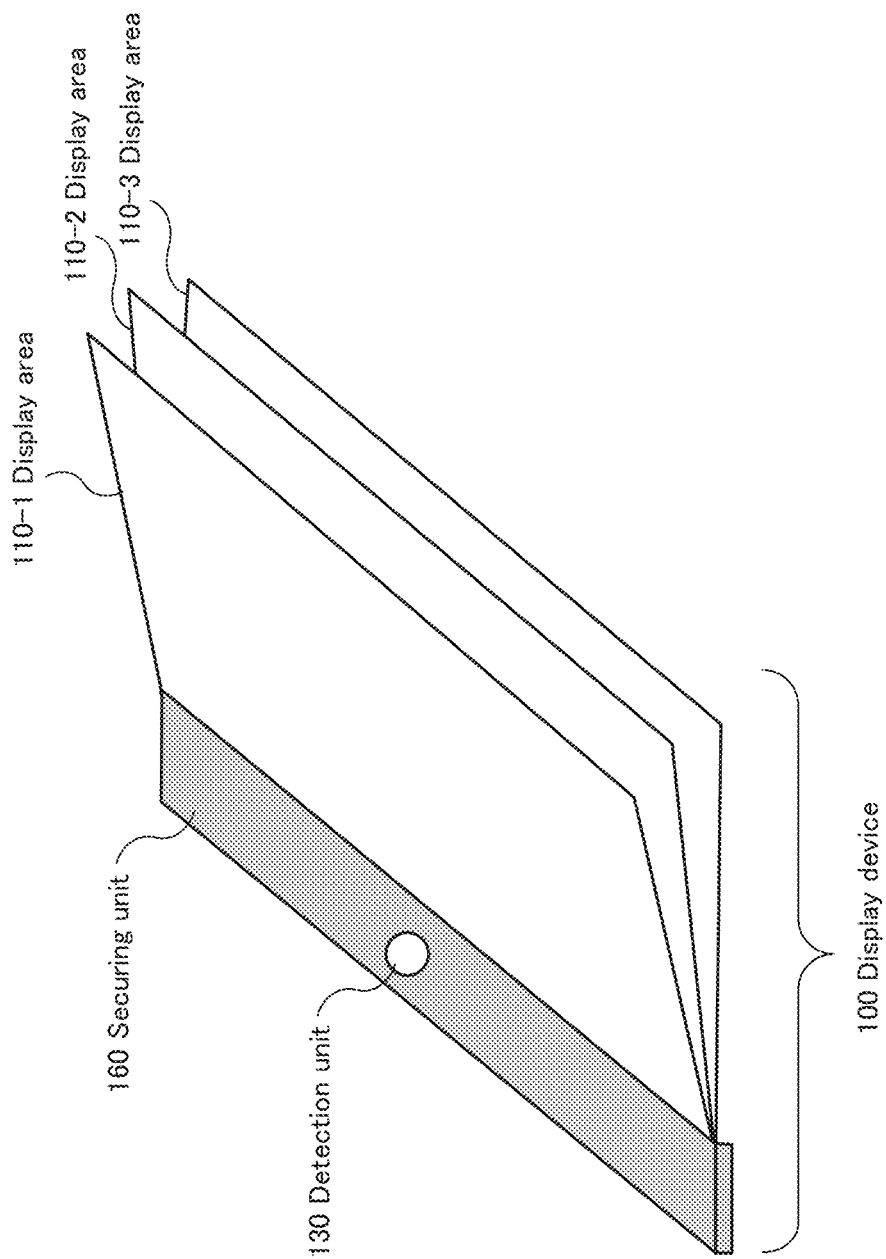
FIG. 7 shows a third example of the outer appearance of the display device shown in FIG. 1.

FIG. 7 shows a third example of the outer appearance of display device 100 that is shown in FIG. 1.

As shown in FIG. 7, display device 100 shown in FIG. 1 may be constituted as three display areas 110-1 to 110-3 that consist of electronic papers that are physically separated and are arranged by being stacked one upon the other as book pages with one side secured by securing unit 160. Display areas 110-1 to 110-3 may be constructions other than electronic paper. In addition, detection unit 130 is arranged at a position that allows detection of the line of sight of the operator who manipulates display device 100. If detection unit 130 is arranged at a position such as shown in FIG. 7, the line of sight of the operator who manipulates display device 100 may not be detectable when display area 110-1 is flipped or when display area 110-1 and display area 110-2 are flipped. As a result, detection unit 130 must be arranged at a position that allows detection of the line of sight of the operator who manipulates the device even when the display areas are flipped.

In the case of a display device having an outer appearance such as shown in FIG. 7, control unit 120 recognizes, of the plurality of display areas, the display area that is arranged farthest to the front as the first display area. In order to recognize which display area is arranged farthest toward the front, control unit 120 may be provided with a mechanism within securing unit 160 that detects whether a display area has been flipped similar to a page of a book and may use this mechanism to recognize the front page. Alternatively, a photosensor may be provided on the display surface-side of each of display areas 110-1 to 110-3, and the display area that is provided with, of these photosensors, the photosensor that detects light may be recognized as the display area that is arranged farthest to the front.

The method of display in display device 100 shown in FIG. 1 is next described. Of the display method in display device 100 shown in FIG. 1, the processes when detection unit 130 shown in FIG. 1 detects that the movement of the line of sight has stopped are first described. A case is here described in which display area 110-1 is taken as the first display area.

Figure 8:
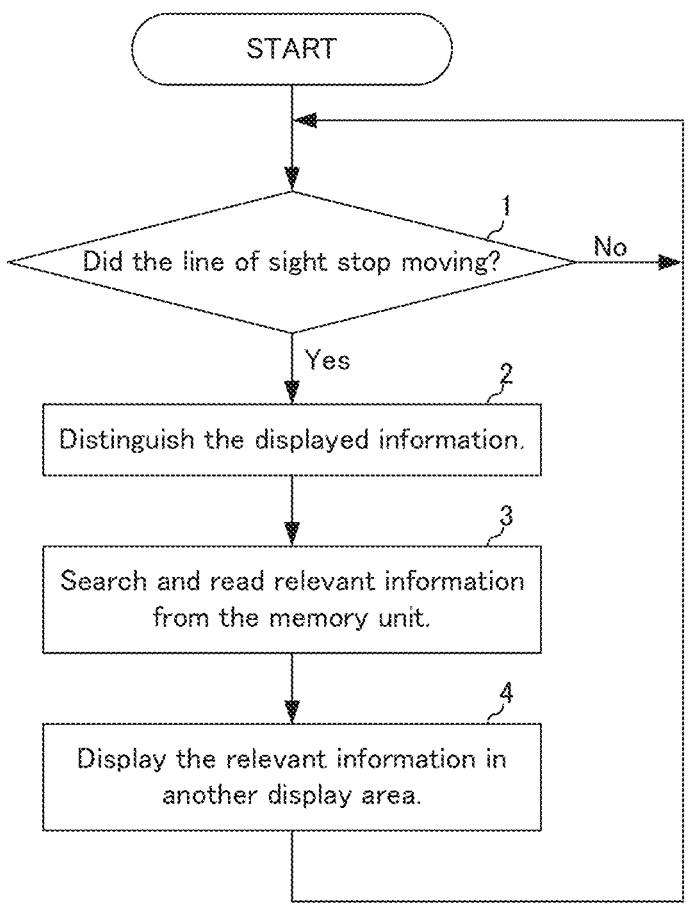
FIG. 8 is a flow chart for describing, of the display method in the display device shown in FIG. 1, the processes when the detection unit shown in FIG. 1 detects that movement of the line of sight stops.

FIG. 8 is a flow chart for describing, of the display method in display device 100 shown in FIG. 1, the processes when detection unit 130 shown in FIG. 1 detects that movement of the line of sight has stopped.

First, when detection unit 130 detects that the movement of the line of sight of the operator that manipulates display device 100 has stopped in Step 1, control unit 120 in Step 2 recognizes the information that is displayed in the direction of the line of sight in display area 110-1.

Control unit 120 then, in Step 3, searches memory unit 140 for relevant information that is related to this information with the recognized information as the search key and reads the relevant information.

In Step 4, control unit 120 next causes the display of the relevant information that was read from memory unit 140 in display areas 110-2 and 110-3 that together constitute the second display area.

Figure 9:
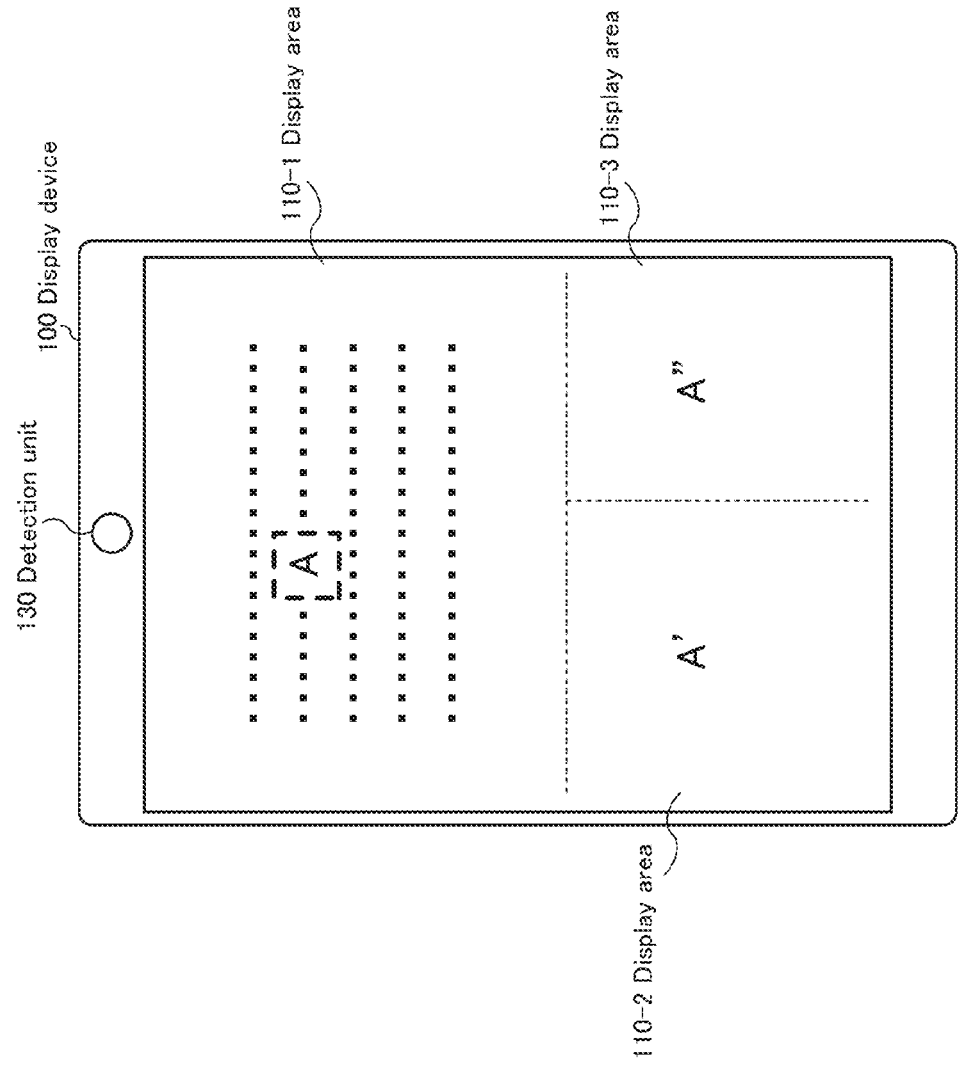
FIG. 9 shows an example of the display when information and relevant information are displayed on the display device that has the outer appearance shown in FIG. 5.

FIG. 9 shows an example of the display when information and relevant information are displayed on display device 100 that has the outer appearance shown in FIG. 5. An example is here shown in which the correspondences of the information and relevant information shown in FIG. 2 are stored in memory unit 140 and the information recognized by control unit 120 is "A."

As shown in FIG. 9, when control unit 120 recognizes that, of the information displayed in display area 110-1 that is the first display area, the information that is displayed in the position at which detection unit 130 detected that the line of sight stopped is "A," "A'" and "A''" that are the relevant information of "A" and that are stored in memory unit 140 are each displayed in display area 110-2 and display area 110-3, respectively, that are the second display area. In FIG. 9, relevant information "A'" is displayed in display area 110-2 and relevant information "A''" is displayed in display area 110-3, but relevant information "A''" may be displayed in display area 110-2 and relevant information "A'" may be displayed in display area 110-3. In addition, control unit 120 may display the position of the direction of the line of sight that is detected by detection unit 130 in display area 110-1 so as to allow identification. For example, control unit 120 may cause display such that "A" is enclosed by a dotted line as shown in FIG. 9, may add color to the portion of "A," or may make the color of the characters of "A" different from the color of characters of other information. Needless to say, the information is not limited to characters such as shown in FIG. 9 but may also be an image such as a photograph or picture.

If the correspondences shown in FIG. 3 are stored in memory unit 140, when control unit 120 has recognized that, of the information that is displayed in display area 110-1 that is the first display area, the information that is displayed at the position at which detection unit 130 has detected that the line of sight has stopped is "A," "A'" that is relevant information 1 and "a'" that is relevant information 2 of "A" that are stored in memory unit 140 are displayed in display areas 110-2 and 110-3, respectively, that together constitute the second display area.

Figure 10:
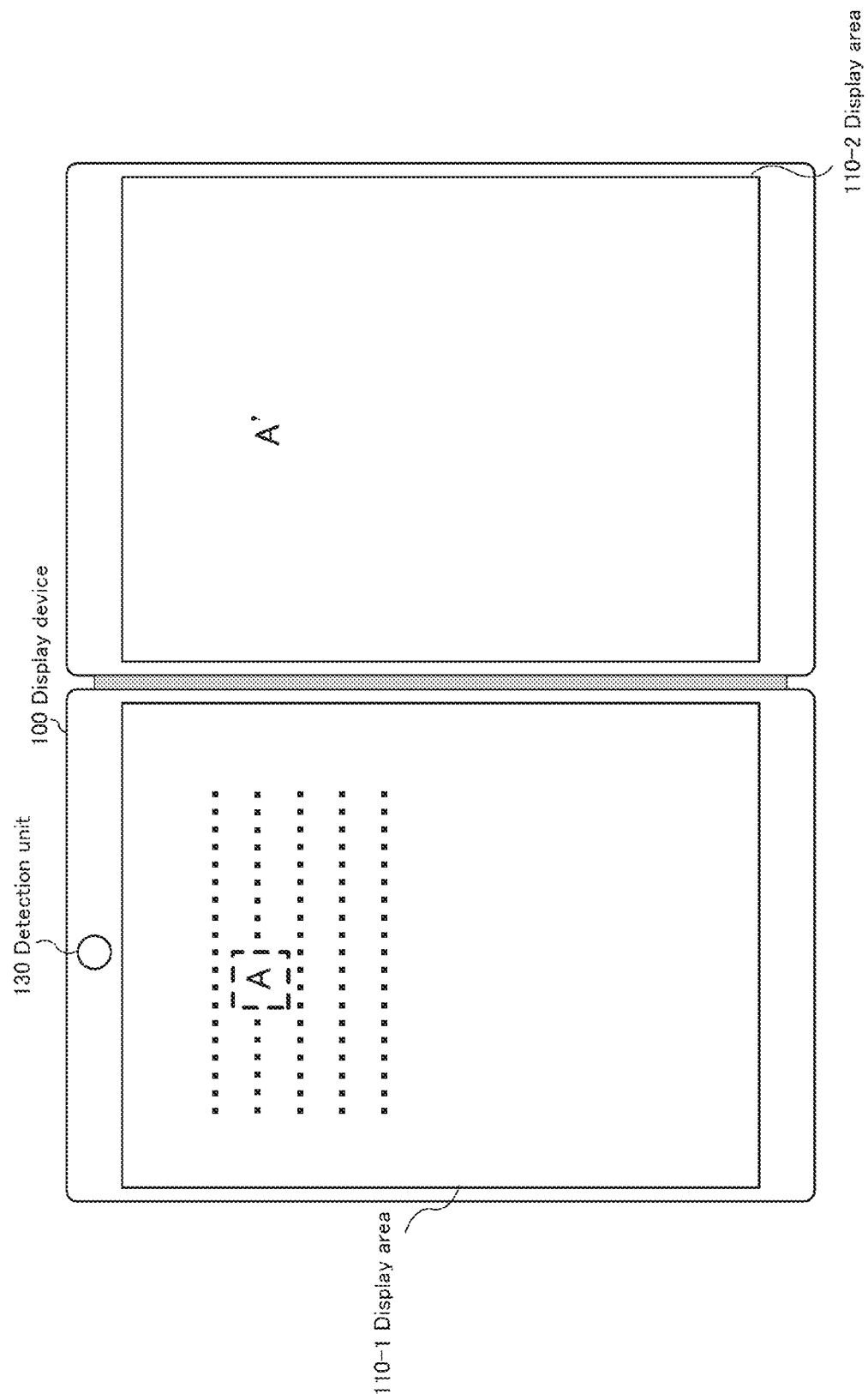
FIG. 10 shows an example of the display when information and relevant information are displayed on the display device that has the outer appearance shown in FIG. 6.

FIG. 10 shows an example of the display when information and relevant information are displayed on display device 100 that has the outer appearance shown in FIG. 6. An example is here shown in which the correspondences of information and relevant information that are shown in FIG. 2 are stored in memory unit 140 and the information recognized by control unit 120 is "A."

As shown in FIG. 10, when control unit 120 has recognized that, of the information that is displayed in display area 110-1 that is the first display area, the information that is displayed at the position at which detection unit 130 has detected that the line of sight has stopped is "A," "A'" that is the relevant information of "A" that is stored in memory unit 140 is displayed in display area 110-2 that is the second display area. Control unit 120 may display the position of the direction of the line of sight that was detected by detection unit 130 so as to allow identification. For example, control unit 120 may display cause "A" to be displayed enclosed by a dotted line as shown in FIG. 10, may add color to the portion of "A," or may make the color of the characters of "A" a different color than the characters of other information. Needless to add, the information is not limited to characters such as shown in FIG. 10 and may be an image such as a photograph or picture.

The processing is next described for a case in which, in a state in which "A'" is displayed in display area 110-2, the operator moves his or her line of sight from display area 110-2 to display area 110-1 and control unit 120 recognizes that, of the information that is displayed in display area 110-1, the information that is displayed at the position at which detection unit 130 detects that the line of sight has stopped is "B." In this case, if it has been detected that the operator has already viewed at least a portion of "A'," control unit 120 may delete at least a portion of "A'" on display area 110-2 or display all of the information in reduced size to secure an area in which the relevant information "B'" of "B" is to be displayed and then displays the relevant information "B'" in display area 110-2. Alternatively, if it is detected that the operator has not already viewed at least a portion of "A'," control unit 120 may display the relevant information "B'" of "B" in a display area (page) other than display area 110-2.

Figure 11:
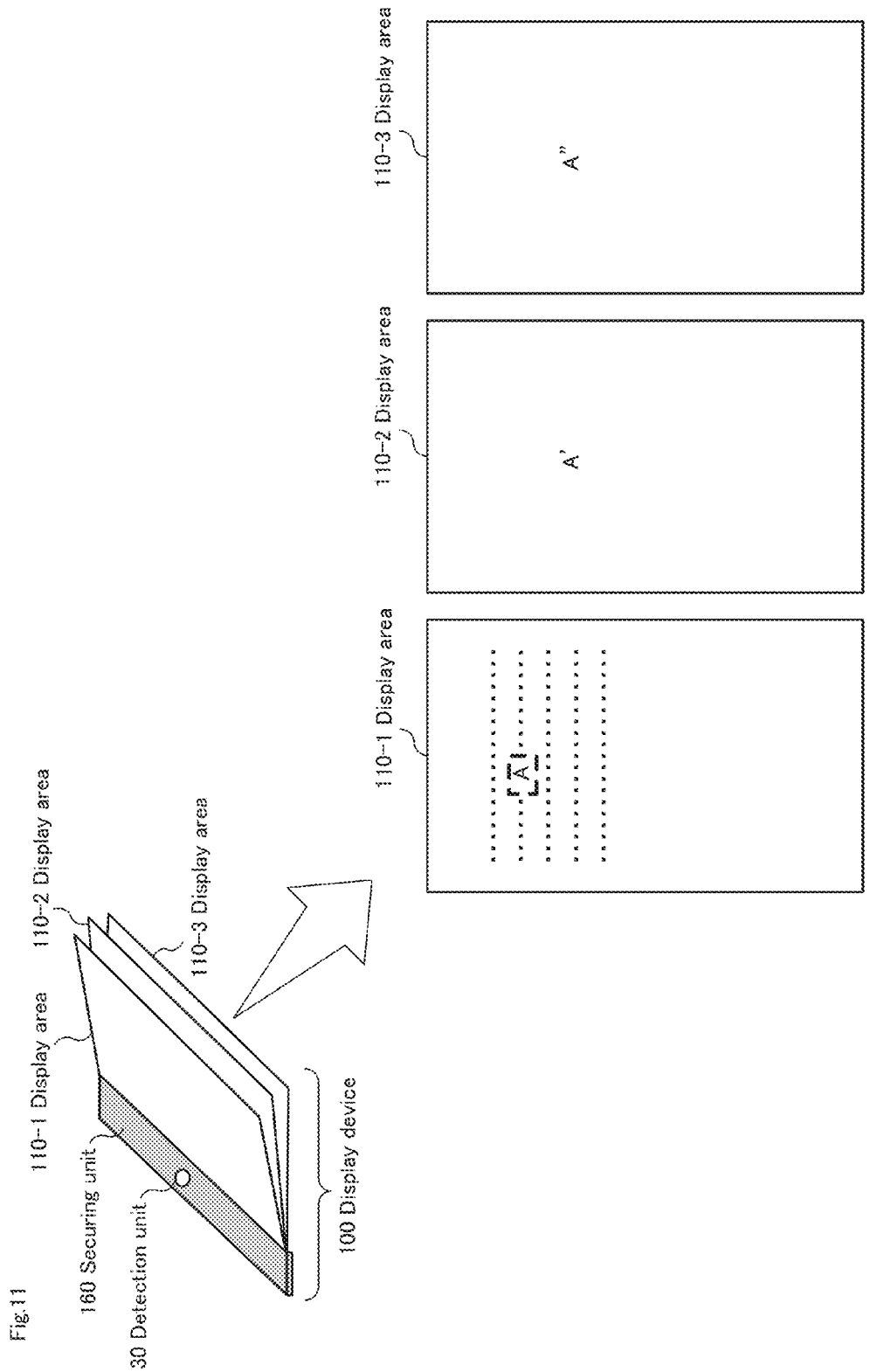
FIG. 11 shows an example of the display when information and relevant information are displayed on the display device that has the outer appearance shown in FIG. 7.

FIG. 11 shows an example of display when information and relevant information are displayed on display device 100 that has the outer appearance shown in FIG. 7. A case is here described in which the correspondences of information and relevant information shown in FIG. 2 are stored in memory unit 140 and the information recognized by control unit 120 is "A."

As shown in FIG. 11, when control unit 120 has recognized that, of the information that is displayed in display area 110-1 that is the first display area, the information that is displayed in the position at which detection unit 130 has detected that the line of sight has stopped is "A," A'" and "A''" that are the relevant information of "A" that are stored in memory unit 140 are each displayed in display areas 110-2 and 110-3, respectively, that are the second display area. In FIG. 11, an example is shown in which relevant information "A'" is displayed in display area 110-2 and relevant information "A''" is displayed in display area 110-3, but relevant information "A''" may be displayed in display area 110-2 and relevant information "A'" may be displayed in display area 110-3. In addition, control unit 120 may display the position of the direction of the line of sight that was detected by detection unit 130 so as to allow identification on display area 110-1. For example, control unit 120 may display "A" enclosed by dotted lines as shown in FIG. 11, may add color to the portion of "A," or may make the color of the characters of "A" different from the color of the characters of other information. Needless to say, the information is not limited to characters as shown in FIG. 11 and may also be an image such as a photograph or a picture.

Still further, when the correspondences shown in FIG. 3 are stored in memory unit 140 and control unit 120 has recognized that, of the information that is displayed in display area 110-1 that is the first display area, the information that is displayed at the position at which detection unit 130 detects that the line of sight has stopped is "A," "A'" that is relevant information 1 of "A" and "a'" that is relevant information 2 of "A" that are stored in memory unit 140 are each displayed in display areas 110-2 and 110-3, respectively, that are the second display area.

Of the display method in display device 100 that is shown in FIG. 1, processes when detection unit 130 shown in FIG. 1 detects blinking of the operator are next described. An example is here described in which display area 110-1 is the first display area.

Figure 12:
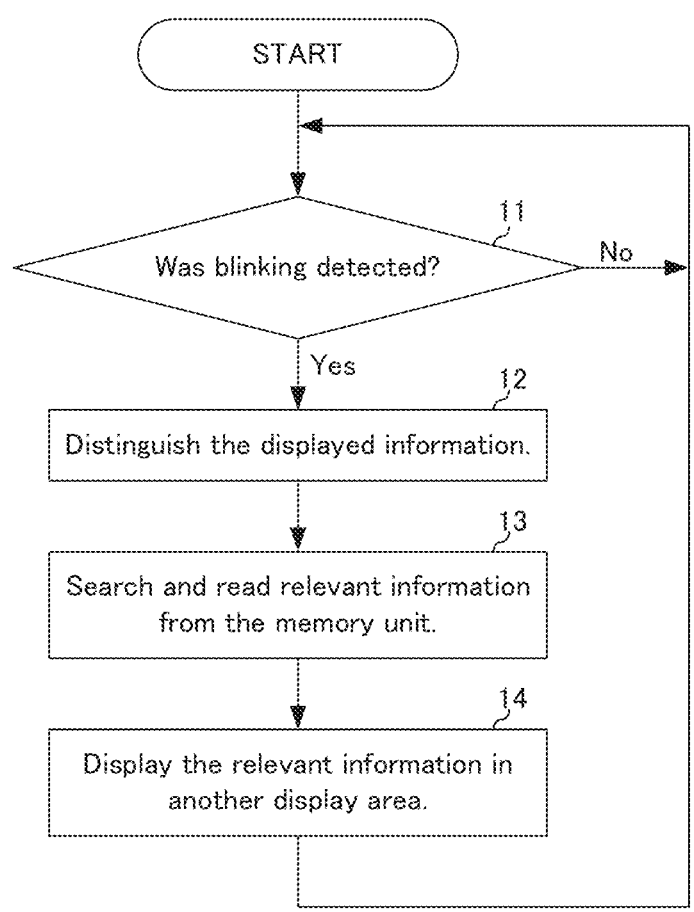
FIG. 12 is a flow chart for describing, of the display method in the display device shown in FIG. 1, the processes when the detection unit shown in FIG. 1 detects blinking of the operator.

FIG. 12 is a flow chart for describing, of the display method in display device 100 shown in FIG. 1, the processes when detection unit 130 shown in FIG. 1 detects blinking of the operator.

First, when detection unit 130 detects that the operator that manipulates display device 100 has blinked in Step 11, control unit 120 recognizes the information that is displayed in the direction of the line of sight in display area 110-1 in Step 12.

In Step 13, control unit 120 next searches for and reads from memory unit 140 relevant information that is related to this information with the recognized information as the search key.

Next, in Step 14, control unit 120 brings about the display of the relevant information that was read from memory unit 140 in display areas 110-2 and 110-3 that are the second display area. The state of the display at this time is the same as shown in FIGS. 9 to 11.

Of the display method in display device 101 shown in FIG. 4, the processes when detection unit 130 shown in FIG. 4 detects that the movement of the line of sight has stopped are described. An example is here described in which display area 110-1 is the first display area.

Figure 13:
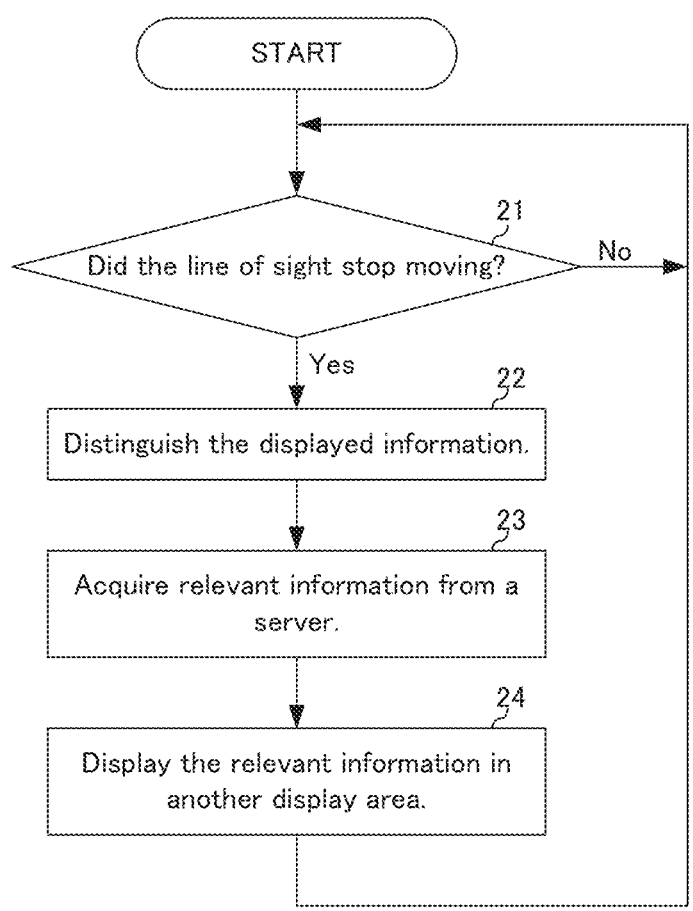
FIG. 13 is a flow chart for describing, of the display method in the display device shown in FIG. 4, the processes when the detection unit shown in FIG. 4 detects that movement of the line of sight stops.

FIG. 13 is a flow chart for describing, of the display method in display device 101 shown in FIG. 4, the processes when detection unit 130 shown in FIG. 4 detects that the movement of the line of sight has stopped.

First, when detection unit 130 detects that the movement of the line of sight of the operator that manipulates display device 101 has stopped in Step 21, control unit 121 in Step 22 recognizes the information that is displayed in the direction of this line of sight in display area 110-1.

Control unit 121 then, in Step 23, acquires relevant information that relates to the information that was recognized from a predetermined server by way of communication unit 150. The method of acquiring the relevant information is as described hereinabove.

Next, in Step 24, control unit 121 causes the display of the relevant information that was acquired by way of communication unit 150 in display areas 110-2 and 110-3 that are the second display area. The state of the display at this time is as shown in FIGS. 9 to 11.

Of the display method in display device 101 shown in FIG. 4, the processes when detection unit 130 shown in FIG. 4 detects blinking of the operator are next described. An example is here described in which display area 110-1 is the first display area.

Figure 14:
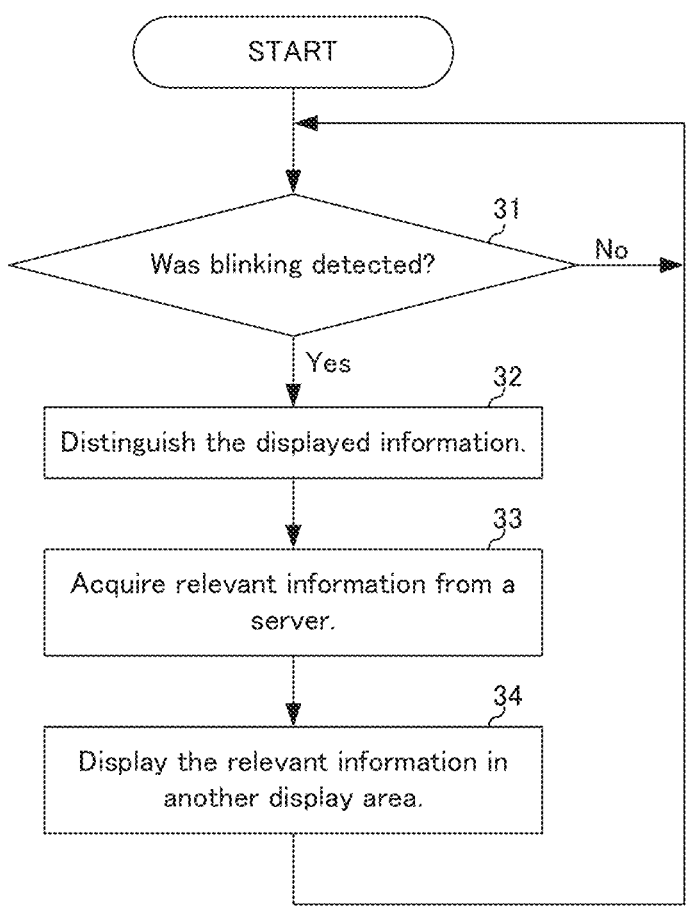
FIG. 14 is a flow chart for describing, of the display method in the display device shown in FIG. 4, the processes when the detection unit shown in FIG. 4 detects blinking of the operator.

FIG. 14 is a flow chart for describing, of the display method in display device 101 shown in FIG. 4, the processes when detection unit 130 shown in FIG. 4 detects blinking by the operator.

First, when detection unit 130 detects that the operator that manipulates display device 101 has blinked in Step 31, control unit 121 in Step 32 recognizes the information that is displayed in the direction of the line of sight in display area 110-1.

Control unit 121 then acquires relevant information that relates to the information that was recognized from a predetermined server by way of communication unit 150 in Step 33. The method of acquiring the relevant information is as described hereinabove.

Next, in Step 34, control unit 121 causes display of the relevant information that was acquired by way of communication unit 150 in display areas 110-2 and 110-3 that are the second display area. The state of the display at this time is the same as shown in FIGS. 9 to 11.

Even when the relevant information is acquired by way of communication unit 150 in this way, items of relevant information that are mutually parallel as shown in FIG. 2 or items of relevant information that are hierarchical as shown in FIG. 3 are acquired and displayed as when relevant information that is stored in memory unit 140 are read.

In addition, the same processes may be carried out for information that is being displayed at the position of the direction of the line of sight of the operator that is being detected by detection unit 130.

For example, in display device 100 shown in FIG. 1, even if the movement of the line of sight of the operator does not stop, control unit 120 may bring about display on the second display area of relevant information that relates to information that is being displayed at the position of the direction of the line of sight together with the movement of the line of sight.

FIG. 15 shows another example of the display when information and relevant information are displayed on display device 100 that has the outer appearance shown in FIG. 7. An example is here described in which the correspondences of information and relevant information shown in FIG. 2 are stored in memory unit 140 and the direction of the line of sight that is detected by detection unit 130 moves from the position at which "A" is displayed to the position at which "B" is displayed.

As shown in FIG. 15, the line of sight that is detected by detection unit 130 moves, and when the direction of this line of sight moves from the position at which, of the information that is displayed in display area 110-1 that is the first display area, "A" is displayed to the position at which "B" is displayed, control unit 120 recognizes "A" and "B" and causes the displaying of each of "A'" that is the relevant information of "A" and "B'" that is the relevant information of "B" that are stored in memory unit 140 in display areas 110-2 and 110-3, respectively, that are the second display area. Although relevant information "A'" is displayed in display area 110-2 and relevant information "B'" is displayed in display area 110-3 in FIG. 15, relevant information "B'" may also be displayed in display area 110-2 and relevant information "A'" may be displayed in display area 110-3. In addition, control unit 120 may cause identifiable display of the position of the direction of the line of sight that is detected by detection unit 130 in display area 110-1. For example, control unit 120 may display "A" enclosed in a rectangle and may display "B" enclosed by a circle as shown in FIG. 15.

In addition, as shown in FIG. 11, control unit 120 may cause display of "A'" in display area 110-2 and the display of "A''" in display area 110-3, and then, after the passage of a predetermined time interval, may cause display of "B'" in display area 110-2 and the display of "B''" in display area 110-3.

When the operator selects information, a method may be implemented that uses a typical operation unit such as a touch panel or input key instead of being realized by the line of sight or blinking as described hereinabove.

In this way, in a display device having a plurality of display areas, relevant information regarding desired information of the information that is displayed in one display area can be displayed merely by an intuitive action.

Display devices 100 and 101 can be applied to various devices such as portable telephones, portable terminals, tablet- or notebook-PCs (Personal Computers), smartphones, PDAs (Personal Digital Assistants), game devices, and electronic books.

The processes implemented by each of the constituent elements provided in the above-described display devices 100 and 101 may also be implemented by logic circuits that are each fabricated according to purpose. Alternatively, a computer program (hereinbelow referred to as a "program") that describes the processing content as procedures may also be recorded on a recording medium that can be read in display devices 100 and 101, and the program that has been recorded on this recording medium may be read and executed by display devices 100 and 101. The recording medium that can be read by display devices 100 and 101 refers to a relocatable recording medium such as a floppy (registered trademark) disk, magneto-optic disk, DVD, or CD, or to an HDD or memory such as ROM or RAM that is incorporated in display devices 100 and 101. The program that is recorded on this recording medium is read by control units 120 and 121 that are provided in display devices 100 and 101, and processes that are identical to those described above are then carried out under the control of control units 120 and 121. In this case, control units 120 and 121 operate as computers that execute the program that is read from the recording medium on which the program has been recorded.

Although the invention of the present application has been described hereinabove with reference to exemplary embodiments, the invention of the present application is not limited to the above-described exemplary embodiments. The configuration and details of the invention of the present application are open to various modifications within the scope of the invention of the present application that will be clear to one of ordinary skill in the art.

This application claims the benefits of priority based on Japanese Patent Application No. 2011-208817 for which application was submitted on Sep. 26, 2011 and incorporates by citation all of the disclosures of that application.

What is claimed is:

1. A display device comprising:
   a plurality of display areas;
   a control unit that recognizes information that is displayed in, from among said plurality of display areas, a first display area and that displays relevant information that relates to the information that was recognized in a second display area other than said first display area; and a detection unit that detects a direction of a line of sight of an operator who manipulates the display device and detects movement of the line of sight;

wherein said control unit recognizes, of the information displayed in said first display area, information displayed in the direction of the line of sight detected by said detection unit and displays relevant information, that relates to the recognized information displayed in the detected direction of the line of sight, in said second display area, and wherein said control unit recognizes, of the information displayed in said first display area, information displayed in the direction of the line of sight at a time when the detection unit detects that movement of the line of sight has stopped and displays relevant information, that relates to the recognized information displayed in the direction of the line of sight at the time when the detection unit detects that movement of the line of sight has stopped, in said second display area at the time when the detection unit detects that movement of the line of sight has stopped.

2. The display device as set forth in claim 1, wherein:

said detection unit further detects a predetermined blinking action of said operator; and said control unit recognizes, of information displayed in said first display area, information displayed in the direction of said line of sight at a time when said detection unit detects said blinking action and displays relevant information, that relates to the recognized information displayed in the direction of said line of sight at the time when the detection unit detects said blinking action, in said second display area.

3. The display device as set forth in claim 1, wherein each of said plurality of display areas is a plurality of display media.

4. The display device as set forth in claim 1, further comprising:

a memory unit that stores information that is acquired beforehand in correspondence with relevant information that relates to said information;

wherein said control unit reads from said memory unit relevant information that relates to said information that has been recognized and displays the relevant information in said second display area.

5. A display method for displaying information in a plurality of display areas, comprising processes of:

recognizing information that is displayed in, from among said plurality of display areas, a first display area;

displaying relevant information that relates to said information that was recognized in a second display area other than said first display area;

detecting a direction of a line of sight of an operator who manipulates the display device;

detecting movement of the line of sight;

recognizing, of the information displayed in said first display area, information displayed in the detected direction of the line of sight;

displaying relevant information, that relates to the recognized information displayed in the detected direction of the line of sight, in said second display area;

recognizing, of the information displayed in said first display area, information displayed in the direction of the line of sight at a time when movement of the line of sight is detected to have stopped; and displaying relevant information, that relates to the recognized information displayed in the direction of the line of sight at the time when movement of the line of sight is detected to have stopped, in said second display area at the time when movement of the line of sight is detected to have stopped.

* * * * *